Figure 1:
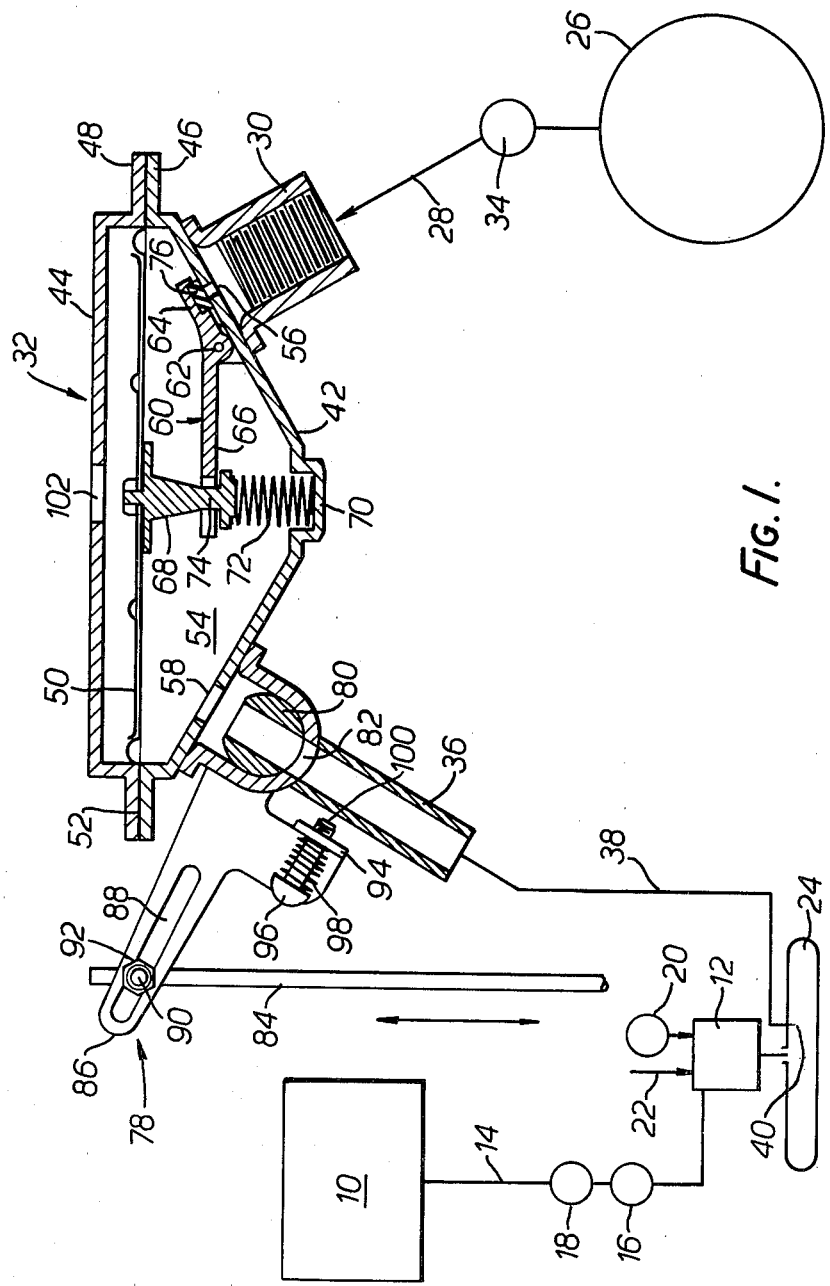

United States Patent [19]

Szloboda

[11] 4,386,594
[45] Jun. 7, 1983

[54] APPARATUS FOR ENABLING AN ENGINE TO BURN EITHER LIQUID FUEL OR GASEOUS FUEL

[76] Inventor: David T. Szloboda, 10591 Skagit Dr., Richmond, British Columbia, Canada, V7E 1Z9

[21] Appl. No.: 259,110

[22] Filed: Apr. 30, 1981

Related U.S. Application Data

[63] Continuation-in-part of Ser. No. 190,921, Sep. 26, 1980, abandoned.

[51] Int. Cl.$^3$ .............................................. F02M 21/02
[52] U.S. Cl. ............................ 123/525; 123/27 GE; 48/180 C; 261/DIG. 68
[58] Field of Search ................. 123/525, 527, 27 GE; 48/180 C; 261/DIG. 68

[56] References Cited

U.S. PATENT DOCUMENTS

| | | | |
|---|---|---|---|
| 2,098,178 | 11/1937 | Corse | 48/180 C |
| 2,152,501 | 3/1939 | Robinson | 123/525 |
| 2,381,304 | 8/1945 | Merrill | 123/525 |
| 2,563,228 | 8/1951 | Ensign | 123/527 |
| 2,571,571 | 10/1951 | Hanners et al. | 123/527 |
| 2,636,814 | 4/1953 | Armstrong et al. | 48/180 C |
| 2,664,872 | 1/1954 | Ericson et al. | 48/180 C |
| 2,868,630 | 1/1959 | Ensign | 48/180 C |
| 2,896,599 | 7/1959 | Ensign | 123/527 |
| 3,640,512 | 2/1972 | Morgenroth | 261/DIG. 68 |
| 3,858,565 | 1/1975 | Buckman et al. | 123/552 |
| 3,960,126 | 6/1976 | Shinoda | 261/DIG. 68 |
| 4,020,810 | 5/1977 | Baverstock | 48/180 C |
| 4,023,538 | 5/1977 | Harpman et al. | 261/DIG. 68 |

Primary Examiner—Charles J. Myhre
Assistant Examiner—E. Rollins Cross
Attorney, Agent, or Firm—Fleit, Jacobson & Cohn

[57] ABSTRACT

Apparatus for enabling an engine to burn either liquid fuel or gaseous fuel, and which includes a gaseous fuel control valve for location in a gaseous fuel supply line between a gaseous fuel storage container and an intake manifold of the engine. The control valve includes a single diaphragm which defines one wall of a chamber having a gas inlet and a gas outlet. An accelerator pedal controlled outlet valve obturator is positioned in the outlet, for controlling the intensity of suction applied to the chamber in response to the position of the accelerator pedal. An inlet valve obturator is provided to control the flow of gaseous fuel through the inlet into the chamber. The inlet valve obturator is connected to the diaphragm so that movement of the diaphragm controls of the inlet valve obturator.

9 Claims, 2 Drawing Figures

APPARATUS FOR ENABLING AN ENGINE TO BURN EITHER LIQUID FUEL OR GASEOUS FUEL

This invention relates to apparatus for enabling an engine to burn either liquid fuel or gaseous fuel. This application is a continuation-in-part application of my prior U.S. application Ser. No. 06/190,921 filed Sept. 26, 1980, now abandoned.

Various systems are known for enabling vehicles with liquid fuel burning engines to also run when desired on compressed or liquified gaseous fuels. These gaseous fuels are often known as liquified petroleum gas (L.P.G.) fuels and examples of such gaseous fuels are propane and butane. The known systems require complicated and expensive changes to the existing carburetion and acceleration systems of the vehicle in order that the vehicle can also run on the gaseous fuel when desired.

It is an aim of the present invention to provide apparatus for enabling an engine to burn either liquid fuel or gaseous fuel, which apparatus is such that the hitherto required complicated and expensive modifications to the carburetion and acceleration systems of a vehicle are not required. More specifically, an aim of the invention is to enable a vehicle that runs on liquid fuel to be converted so that it can also run when desired alternatively on gaseous fuel. This is accomplished by having the apparatus such that it can feed the gaseous fuel to the inlet manifold of the engine, thereby bypassing the carburettor and the need for complicated adjustments to the carburettor. Furthermore, since the gaseous fuel is admitted to the inlet manifold of the engine, this can be simply done on different types of vehicles and the fact that the different types of vehicles may have widely differing types of carburettors is of no consequence.

Accordingly, this invention provides apparatus for enabling an engine to burn either liquid fuel or gaseous fuel, which apparatus comprises:

(i) a gaseous fuel control valve for installation in a gaseous fuel supply line leading from a gaseous fuel storage container to an intake manifold of the engine, (ii) a liquid fuel shut-off valve for shutting off the supply of liquid fuel when the engine is to run on gaseous fuel, and (iii) a gaseous fuel shut-off valve for shutting off the supply of gaseous fuel when the engine is to run on liquid fuel, the gaseous fuel control valve comprising:

(a) housing means defining a compartment, (b) a single diaphragm which is positioned in the compartment and which defines one wall of a chamber, the housing means defining the remaining boundaries of the chamber, and the side of the diaphragm opposite the chamber being in communication with atmospheric pressure, (c) a gas inlet into the chamber and adapted for connection with a conduit leading from a gaseous fuel storage container, (d) a gas outlet from the chamber and adapted for connection to an intake manifold of the engine, (e) outlet valve obturator means which is controlled by an accelerator pedal of the vehicle in use of the apparatus and which is for controlling the intensity of the suction applied to the chamber in response to the position of the accelerator pedal, whereby the flow rate of the gaseous fuel through the gas outlet to the intake manifold of the engine is regulated by the suction created by the engine in the intake manifold so that a correct air:gaseous fuel mixture is achieved for varying engine operating requirements, and (f) inlet valve obturator means for controlling the flow of gaseous fuel through the gas inlet into the chamber, the inlet valve obturator means being connected to the diaphragm such that movement of the diaphragm in a direction tending to decrease the size of the chamber increases the size of the inlet and movement of the diaphragm in a direction tending to increase the size of the chamber decreases the size of the inlet, whereby the pressure of the gaseous fuel in the chamber is balanced about a value which is appropriate for the engine's momentary operating requirements and which is determined by the suction created by the engine in the intake manifold.

Preferably, the outlet valve obturator means comprises a rotary valve obturator member.

Preferably, the inlet valve obturator means comprises a pivotally mounted elongate member which is connected at one end portion to a centre portion of the diaphragm and which is provided at its other end portion with a sealing pad. The sealing pad is advantageously made of a flexible non-metallic material and the sealing pad ensures that a good seal is effected at the gas inlet.

The end portion of the elongate member which is connected to the centre portion of the diaphragm may be biased by spring means towards the diaphragm.

The apparatus of the invention advantageously includes diaphragm hold-down means for holding the diaphragm in a down position tending to increases the size of the chamber when the engine is to operate at maximum acceleration, whereby the gas inlet will be retained permanently open so that an increased amount of gaseous fuel can be drawn from the chamber by the suction.

The diaphragm hold-down means may comprise a pivotally mounted lever which is controlled in dependence upon the position of the accelerator pedal.

The apparatus of the invention may also advantageously include preheating means for preheating the gaseous fuel after it has left the gas outlet and before it reaches the inlet manifold.

The preheating means may comprise a gas conduit which is caused to pass around an exhaust manifold of the engine.

The liquid fuel shut off valve and the gaseous fuel shut off valve may be any appropriate type of valve and they may be, for example, valves which require to be flicked from one position to another to cause them to change their state, or valves which require to be rotated to cause them to change their operational state, or valves which operate in a push/pull mode.

The present invention also extends to vehicles when provided with the apparatus of the invention. The vehicles may be any desired vehicles such for example as motor cars and commercial vehicles such as lorries and buses.

Figure 2:
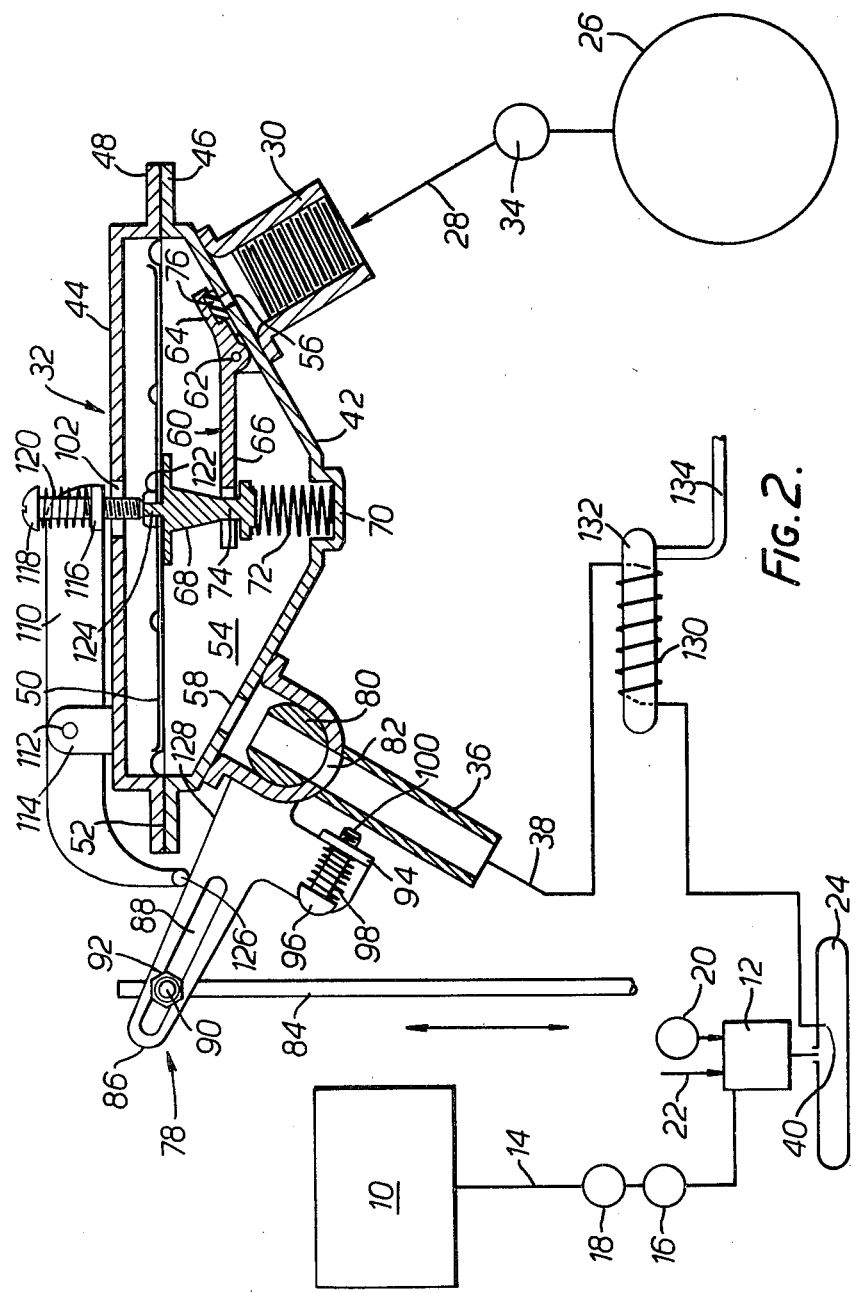

Embodiments of the invention will now be described solely by way of example and with reference to the accompanying drawings in which:

FIG. 1 shows first apparatus for enabling an engine to burn either liquid fuel or gaseous fuel; and FIG. 2 shows second apparatus for enabling an engine to burn either liquid fuel or gaseous fuel.

Referring to FIG. 1, a conventional gasoline fuel system is schematically shown to include a fuel tank 10, a carburettor 12, and a fuel supply line 14 leading from the tank 10 to the fuel inlet of the carburettor 12. The line 14 includes a fuel pump 16 and a gaseous fuel shut-off valve in the form of an ON/OFF valve 18. The carburettor 12 includes an accelerator pedal operated valve 20 and an air inlet 22. The outlet of the carburettor 12 is connected to the intake manifold 24 of an internal combustion engine.

The gaseous fuel system comprises a gaseous fuel storage tank 26, a gaseous fuel supply line 28 leading from the tank 26 to an inlet fitting 30 of a gaseous fuel control valve 32, and a gaseous fuel shut-off valve in the form of an ON/OFF valve 34. The valve 34 is located in the fuel supply line 28.

The valve 32 includes a gas outlet fitting 36 which is connected to a conduit 38 which delivers a metered amount of gaseous fuel from the valve 32 into the intake manifold 24. According to an aspect of the invention, the gaseous fuel is discharged at a location 40 which is generally below and to the engine wall side of the location where the carburettor 12 delivers a fuel:air mixture into the intake manifold when gasoline is being burned by the engine. When the gaseous fuel is discharged into the intake manifold 24, it can then mix with the air passing through the carburettor 12 when the valve 18 has been turned off and the engine is to run only on the gaseous fuel.

The valve 32 comprises a two part housing 42, 44 having flanges 46, 48 where the two housing parts 42, 44 are joined. A diaphragm 50 is located within the housing and it includes an outer peripheral portion 52 which is clamped between the flanges 46, 48.

As shown, the diaphragm 50 and a wall section 42 of the housing together define a chamber 54 which is essentially closed but which includes a gas inlet orifice 56 and a gas outlet orifice 58.

An inlet valve obturator member 60 is pivotally mounted on a pivot pin 62 at a location offset from the inlet orifice 56. The inlet valve obturator member 60 includes a closure portion 64 which extends from the pivot pin 62 over to a position over the inlet orifice 56. The inlet valve obturator member 60 also includes a control arm portion 66 which projects from the pivot pin 62 in the opposite direction and engages a post 68 which extends from the centre of the diaphragm 50 towards a centre portion 70 of the housing part 42. The centre portion 70 is shown to be in cup form and is also shown to receive one end of a coil spring 72. The opposite end of the coil spring 72 engages the lower (as pictured) end of the post 68. The post end of the control arm portion 66 is forked and a reduced dimentioned portion 74 of the post 68 is received within the space between the two side parts of the fork.

The closure portion 64 includes a closure plug member 76 which is constructed from soft rubber or a similar material and which is for giving a good seal at the inlet orifice.

As will be apparent, downward movement of the diaphragm 50 as shown in FIG. 1 will result in a decrease in the size of the chamber 54 and in an upward or opening movement of the closure member 76. This will permit a flow of gas through the orifice 56 into the chamber 54. Upward (as pictured) movement of the diaphragm 50 will result in an increase in the size of the chamber 54 and a decrease and eventual closing of the orifice 56 by the closure member 76.

The valve 32 includes a gas flow control valve 78. The valve 78 is controlled by an accelerator pedal of the vehicle. The valve 78 comprises a rotary valve obturator member 80 located between the outlet orifice 58 and the outlet fitting 36. Rotation of the obturator member 80 causes a change in the area of an orifice 82 defined immediately downstream of the obturator member 80.

A control rod 84 which moves in response to movement of the accelerator pedal, is secured to a control lever portion 86 of the valve 78. The lever portion 86 is provided with a slot 88 which receives a threaded side piece 90, and serves to secure the control rod 84 to the lever portion 86. As will hereinafter be described in greater detail, the slot 88 provides a way of adjusting the position of the obturator member 80 relative to the accelerator pedal (not shown).

As shown, the lever portion 86 includes a support shelf 94 which contains an internally threaded opening for receiving a stop bolt 96. A compression spring 98 is shown located between the shelf 94 and the head of the stop bolt 96. A screwdriver is used to rotate the stop bolt 96 for adjusting the position of its end 100 relative to the outlet fitting 36, to provide a way of limiting the amount of rotation of the obturator member 80.

As shown, the side of the diaphragm 50 opposite or outside of the chamber 54 is in communication with atmospheric pressure, such as via an opening 102 in the housing part 44.

It is believed that the best location to mount the valve 32 is on the engine as close as possible to a position which is vertically in line with the carburettor control arm. The control rod 84 is then connected at its end opposite the lever portion 86 to the carburettor control arm. This connection of the control rod 84 to the carburettor control arm (not shown) ensures that an appropriate amount of air for admixture with the gas coming from the conduit 38 is achieved. This position of mounting the valve 32 will ensure that any vibration or rattling of the engine will not cause motion which will adversely affect operation of the valve 32.

The manner of installing the valve 32 in a vehicle may be as follows. The vehicle engine is first run on gasoline to warm it up until the automatic choke opens. Then, the gasoline line 14 is closed by operation of the ON/OFF valve 18. The engine will continue to burn gasoline until all of the gasoline in the carburettor is completely used up. Then, the user connects the control rod 84 to the accelerator linkage and preferably to the control arm on the carburettor.

The lever portion 86 is initially held in a down position so that the obturator member 80 is closed. Then mouth suction is applied on the conduit 38 and at the same time the screw 96 is rotated for the purpose of setting the obturator member 80 to a slightly open or approximately idling speed position. Next, the lower end of conduit 38 is positioned inside the intake manifold 24, substantially immediately below the opening leading from the carburettor 12, on the engine block side thereof. This may easily be done by inserting a piece of copper pipe of appropriate length through a brass nipple which is adapted to thread into an opening provided in the manifold 24, such that when the nipple is tightened, the inner end of the copper pipe is properly placed below the opening leading from the carburettor, to the engine block side of the intake manifold. A short length of the copper pipe is allowed to project upwardly through the nipple, for connection to a hose which forms the remaining part of the conduit 38 leading from the conduit 36 to the piece of copper pipe.

The gaseous fuel storage tank 26 may be located at any convenient and legal location within the vehicle. As is well known, the tank 26 will include liquified gaseous fuel and the fuel above the liquid level (not shown) in the tank 26 will be in gaseous form. The gaseous fuel supply line 28 is connected between the storage tank 26 and the inlet fitting 30 as shown. After such installation has been accomplished, the ON/OFF valve 34 is opened. The engine is started and the adjusting screw 96 is turned to set the idling position of the obturator member 80. Then, the connection is made between the rod 84 and the lever portion 86, i.e. a nut 92 is installed and tightened. The connection at 90, 92, 86 provides a pivotal connection. The obturator member 80 will regulate the amount of gas needed for different sizes of engines. By use of the slot 88, the obturator member 80 can be adjusted not to open completely at maximum r.p.m., but only as desired for maximum fuel efficiency at any speed. The desired maximum open position of the obturator member 80 is set by moving the side piece 90 in position within the slot 88 before tightening the nut 92.

The size of the compression spring 72 is dependent upon the stored pressure of gas within the tank 26. For example, in an installation in which the storage pressure within the tank is approximately 200 p.s.i. gas pressure, the compression spring 72 should provide about 150 gram force. The gas pressure in the tank 26 may be 150 lbs pressure.

The tank 26 does not include a pressure reducing valve in its outlet. As a result of this fact, and at least partially also due to the relatively close location of the chamber 54 to the manifold 24, icing of fittings and conduits should be prevented or reduced.

The ON/OFF valves 18, 34 are preferably readily available low cost valves which are adapted to be controlled by manual choke cables.

In use of the valve 32, it is important when switching from gasoline to gaseous fuel to use up all of the gasoline that remains in the carburettor before opening the gaseous fuel valve 34. If this is not done, the engine will receive both gaseous fuel and gasoline and will become flooded. When switching from gaseous fuel to gasoline, it may be necessary to usually start once or twice to cause the gasoline pump to pump gasoline into the empty carburettor.

Proper operation of the valve 32 will produce a fluttering movement of the valve members 64, 76. At high speeds, the "fluttering" movement will result in a rattling sound inside the valve 32 which can be detected by use of a listening device, indicating proper functioning of the valve 32. Gaseous fuel entering the chamber 54 through the orifice 56 will expand and will increase the pressure within the chamber 54. At the same time, the suction or vacuum present in the intake manifold 24, communicated with the chamber 54 via the conduit 38, the inlet fitting 36, the valve port in the obturator member 80 and the orifice 58, will tend to lower the pressure within the chamber 54. Thus, there are two opposite forces acting on the same side of the diaphragm 50. The expanding gas from the orifice 56 will act to force the diaphragm 50 upwards and the suction will act to cause the diaphragm 50 to move downwards. As the expanding gas forces the diaphragm upwards, the member 76 closes the orifice 56. This prevents the gas entering the chamber 56 and the suction then becomes the dominant force controlling the movement of the diaphragm 50. In use of the valve 32, the diaphragm 50 will be constantly moving in response to the pressure and suction forces and as it moves it will cause the members 64, 76 to "flutter" as they perform to regulate the flow of gaseous fuel through the orifice 56.

The valve 32 may be regarded as a self-regulating and self-balancing valve. More specifically, the valve 32 is effective to itself balance the pressure within the chamber 54. The valve 32 is also effective itself to regulate the intensity of the suction in the chamber 54. This means that the valve 32 will deliver the desired pressure of gas regardless of the supply pressure in the tank 26. The valve 32 will also always deliver the desired quantity of gas as determined by the setting of the obturator member 80. The valve 32 eliminates the need for a pressure regulating valve in the outlet of the tank 26 and the known associated problem of icing caused by the decompression of the gas. The expansion through the small orifice of a pressure regulator valve results in a decrease in temperature of the gas to a level at which the gas freezes solid. This is clearly undesirable and this problem is obviated or reduced by the present invention.

Referring now to FIG. 2, it will be seen that apparatus similar to FIG. 1 has been described. Similar parts as in FIG. 1 have been given the same reference numeral and their precise construction and operation will not again be given.

In FIG. 2, there is shown diaphragm hold-down means in the form of a lever 110 which is pivotally mounted by a pivot pin 112 to a post 114 which is upstanding from the housing part 44. One end of the lever 110 is provided with a support shelf 116. The support shelf 116 has a screw threaded aperture through which is screwed a screw 118. As shown, a compression spring 120 is positioned between the support shelf 116 and the head of the screw 118. The shank of the screw 118 extends through the aperture 102 and rests on a nut 122 which screws over a threaded portion 124 of the post 68 to secure the post 68 to the diaphragm 50.

The end of the lever 110 remote from the screw 118 is curved as illustrated and it terminates in a roller member 126. This roller member 126 is adapted to move along the inclined surface 128 of the lever portion 86 as the lever portion 86 is moved up and down by the rod 84.

The lever 110 and the screw 118 will be so positioned that when maximum acceleration from the engine is required, the lever portion 86 will be in such a position that the lever 110 and the screw 118 will hold the diaphragm 50 in its downward position so that the diaphragm 50 will not be able to be moved upwardly by virtue of expansion of the compressed gas passing through the orifice 56 into the chamber 54. This will allow the vacuum in the gas outlet fitting 36 to draw off more gas from the chamber 54 than would be the case if the diaphragm 50 were allowed to move upwardly and thus increase the size of the chamber 54. Care should be taken that the adjustment screw 118 does not open the inlet 56 but only restricts the upward movement of the diaphragm 50 in the "kick-down" position.

Also shown in FIG. 2 is preheating means for preheating the gaseous fuel after it has left the gas outlet 36 and before it reaches the inlet manifold 24. The preheating means is shown in the form of an extension of the conduit 38 so that it forms a coil 130 around an exhaust manifold 132 of the engine. An exhaust pipe 134 is shown schematically attached to the exhaust manifold 132. Because the exhaust manifold 132 is hot, it will heat the gas in the conduit 38. This gas in the conduit 38 may be almost at freezing point due to the fact that it will have expanded considerably from when it was in the tank 26. Considerably further expansion of the gas occurs in the coil 130 than would take place only in the intake manifold 24. This expanded gas is thus more easily able to satisfy the suction in the intake manifold and so there is less of a suction acting on the bottom of the diaphragm 50. This in turn means that a smaller amount of gas is required to be withdrawn from the chamber 54, which in turn gives greater fuel efficiency.

It is to be appreciated that the embodiments of the invention described above have been given by way of example only and that modifications may be effected. Thus, for example, the member 76 may be omitted from the member 64 if desired.

I claim:

1. Apparatus for enabling an engine to burn either liquid fuel or gaseous fuel, which apparatus comprises:
   (i) a gaseous fuel control valve for installation in a gaseous fuel supply line leading from a gaseous fuel storage container to an intake manifold of the engine,
   (ii) a liquid fuel shut-off valve for shutting off the supply of liquid fuel when the engine is to run on gaseous fuel, and
   (iii) a gaseous fuel shut-off valve for shutting off the supply of gaseous fuel when the engine is to run on liquid fuel, the gaseous fuel control valve comprising:
   (a) housing means defining a compartment,
   (b) a single diaphragm which is positioned in the compartment and which defines one wall of a chamber, the housing means defining the remaining boundaries of the chamber, and the side of the diaphragm opposite the chamber being in communication with atmospheric pressure,
   (c) a gas inlet into the chamber and adapted for connection with a conduit leading from a gaseous fuel storage container,
   (d) a gas outlet from the chamber and adapted for connection to an intake manifold of the engine,
   (e) outlet valve obturator means which is controlled by an accelerator pedal of the vehicle in use of the apparatus and which is for controlling the intensity of the suction applied to the chamber in response to the position of the accelerator pedal, whereby the flow rate of the gaseous fuel through the gas outlet to the intake manifold of the engine is regulated by the suction created by the engine in the intake manifold so that a correct air:gaseous fuel mixture is achieved for varying engine operating requirements, and
   (f) inlet valve obturator means for controlling the flow of gaseous fuel through the gas inlet into the chamber, the inlet valve obturator means being connected to the diaphragm such that movement of the diaphragm in a direction tending to decrease the size of the chamber increases the size of the inlet and movement of the diaphragm in a direction tending to increase the size of the chamber decreases the size of the inlet, whereby the pressure of the gaseous fuel in the chamber is balanced about a value which is appropriate for the engine's momentary operating requirements and which is determined by the suction created by the engine in the intake manifold.

2. Apparatus according to claim 1 in which the outlet valve obturator means comprises a rotary valve obturator member.

3. Apparatus according to claim 1 in which the inlet valve obturator means comprises a pivotally mounted elongate member which is connected at one end portion to a centre portion of the diaphragm and which is provided at its other end portion with a sealing pad.

4. Apparatus according to claim 3 in which the sealing pad is made of a flexible non-metallic material.

5. Apparatus according to claim 3 or claim 4 in which the end portion of the elongate member which is connected to the centre portion of the diaphragm is biased by spring means towards the diaphragm.

6. Apparatus according to claim 1, claim 2 or claim 3 and including diaphragm hold-down means for holding the diaphragm in a down position tending to decrease the size of the chamber when the engine is to operate at maximum acceleration, whereby the gas inlet will be retained permanently open so that an increased amount of gaseous fuel can be drawn from the chamber by the suction.

7. Apparatus according to claim 6 in which the diaphragm hold-down means comprises a pivotally mounted lever which is controlled in dependence upon the position of the accelerator pedal.

8. Apparatus according to claim 1, claim 2 or claim 3 and including preheating means for preheating the gaseous fuel after it has left the gas outlet and before it reaches the inlet manifold.

9. Apparatus according to claim 8 in which the preheating means comprises a gas conduit which is caused to pass around an exhaust manifold of the engine.

* * * * *